Feb. 26, 1963
D. P. SHUTT
3,078,711
GEAR AND BEARING TEST APPARATUS AND
TORQUE INDUCER COUPLING THEREFOR
Filed March 20, 1959
2 Sheets-Sheet 1
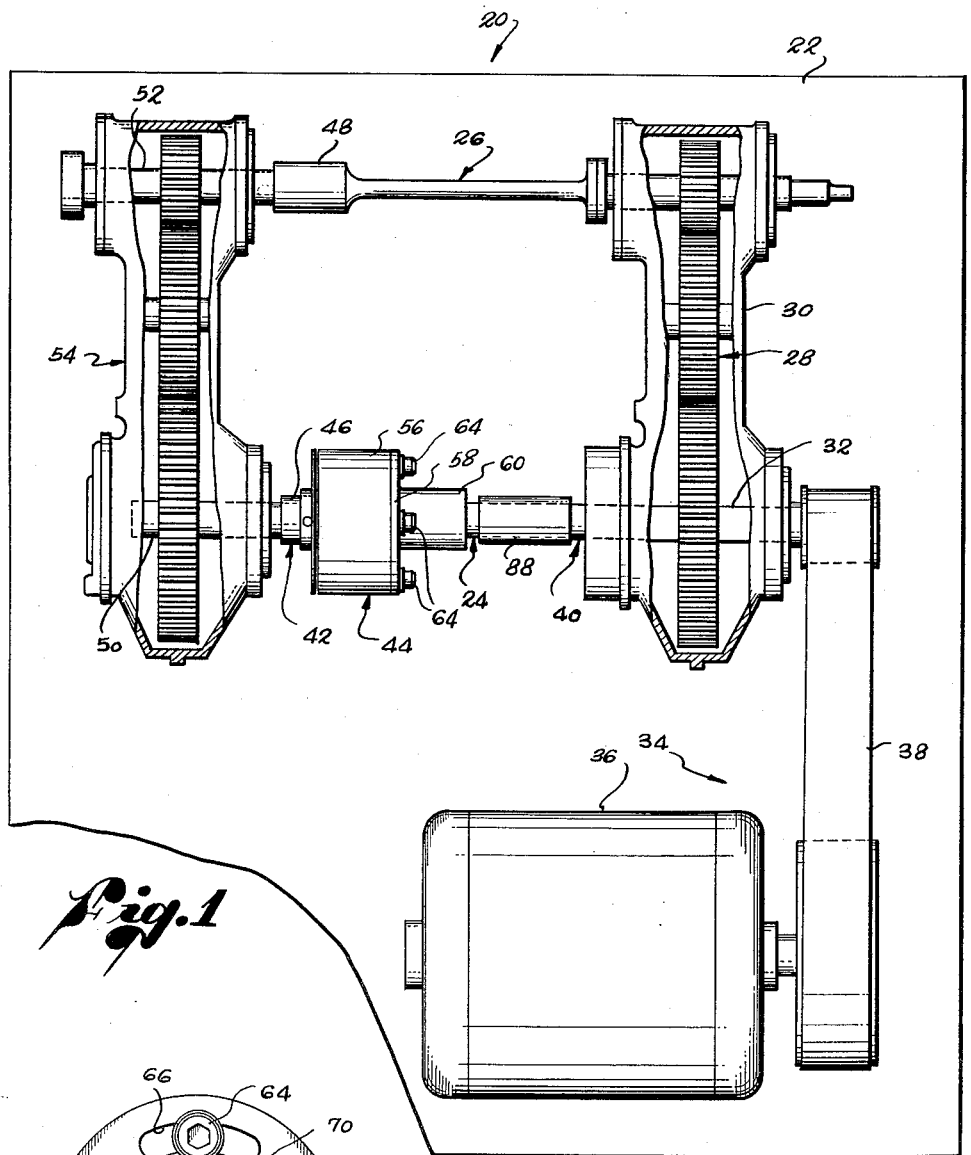
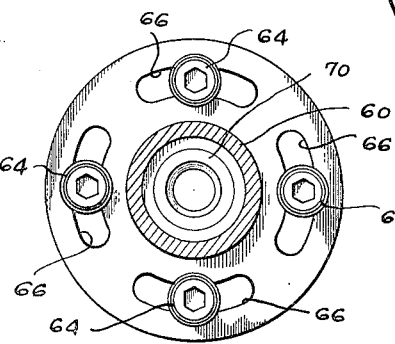
INVENTOR.
DONALD P. SHUTT
BY Forrest J. Lilly
Attorney

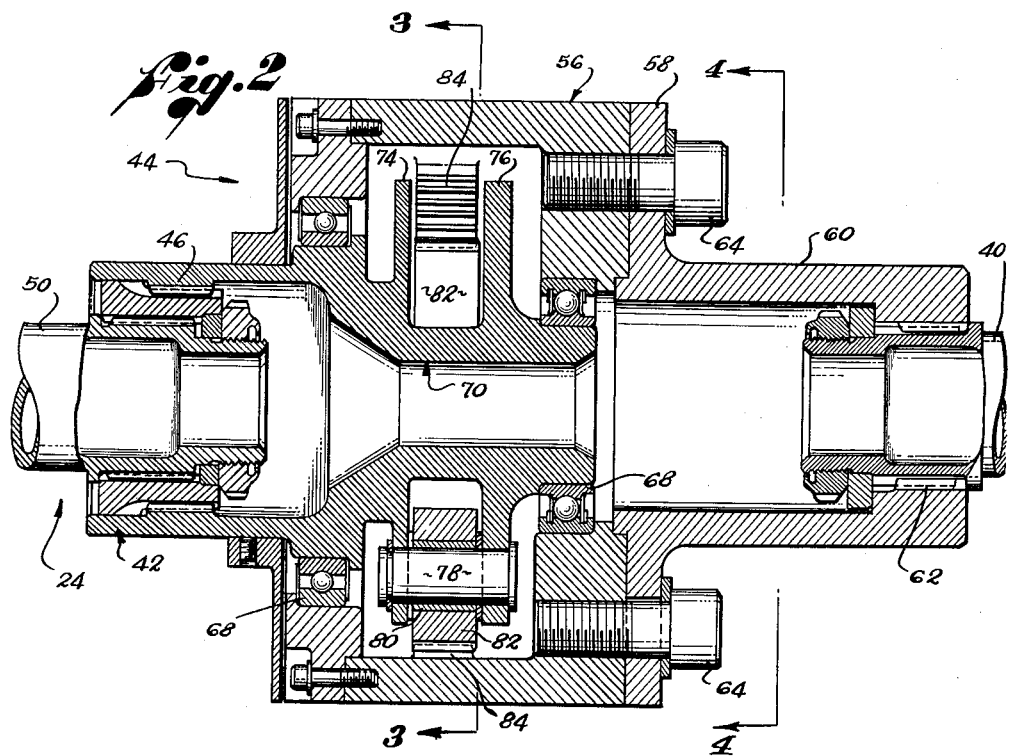
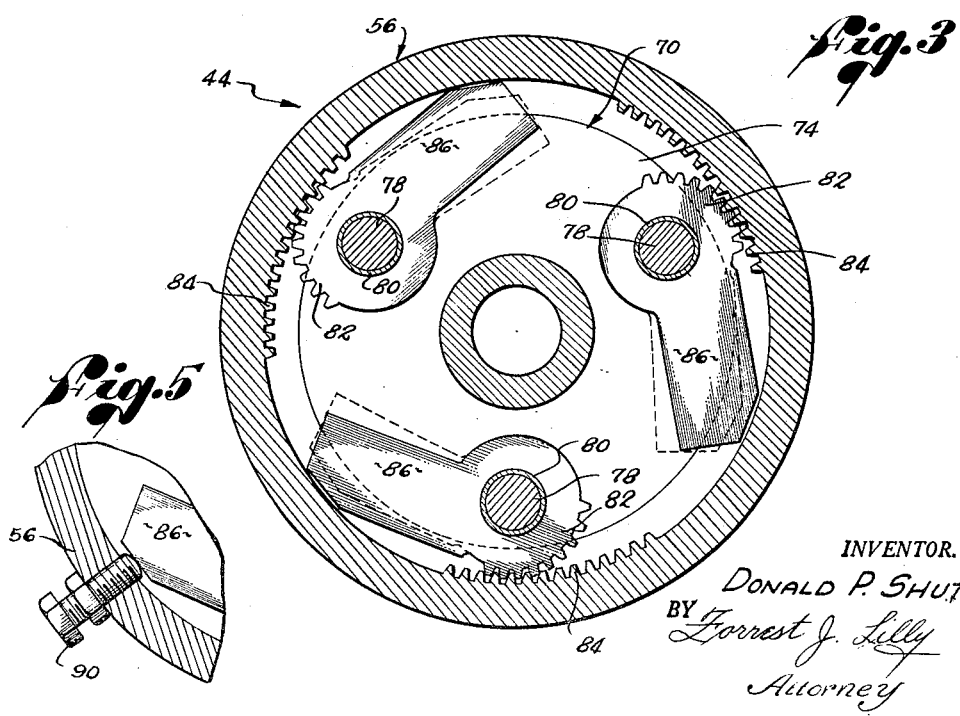

United States Patent Office 3,078,711
Patented Feb. 26, 1963

3,078,711
GEAR AND BEARING TEST APPARATUS AND TORQUE INDUCER COUPLING THEREFOR
Donald P. Shutt, Garden Grove, Calif., assignor to Western Gear Corporation, Lynwood, Calif., a corporation of California
Filed Mar. 20, 1959, Ser. No. 800,868
5 Claims. (Cl. 73—162)

This invention relates generally to apparatus for testing gears and gear trains and their bearings, and more particularly to an improved, so-called "four square" gear and bearing test apparatus and a torque inducer coupling for use therein.

Accurate testing of gears and transmissions to determine such factors as wear life, bearing life, fatigue life, frictional torque and dynamic stability, as well as the effect of various lubricants on these factors, requires that actual conditions of load and speed be imposed during the tests. For this reason, tests of this nature are generally conducted with a so-called "four square" gear test apparatus.

Briefly stated, such an apparatus is equipped with a pair of torsion members drivably coupled at one end by a reaction gear train. The other ends of the members carry coupling means for connection to a test gear train so as to form a closed torque loop. One torsion member is driven in rotation from a suitable rotary drive means, such as an electric motor. The other torsion member, as well as the gears of the reaction and test gear trains, are thereby also driven, the arrangement forming a closed torque loop, as just mentioned.

A desired load is imposed on the test gear train by introducing a torsional twist or torque into the torsion members. Various ways have been devised for introducing this twist. For example, one way in which this is presently accomplished is to make one of the torsion members in two separate sections which are capable of being relatively "twisted" or turned on their axis of rotation. These sections are connected by some type of torque coupling which is capable of adjustment to relatively twist or rotate the sections through a predetermined angle.

The existing "four square" gear and bearing test apparatus and torque couplings for use therein are deficient in several respects. The primary deficiency of the existing apparatus resides in the fact that they are preloaded. That is, the torque couplings of the apparatus are adjusted to obtain a desired load, and this load is "locked in" the system, before the apparatus is started.

Such locked in preloads are extremely undesirable for two reasons. First, the preload squeezes the oil films out of the bearing and gear tooth contact surfaces. Since apparatus of this type frequently operate with a "dry sump" and have a lubrication system powered by the same motor which operates the apparatus, the preloaded bearing surfaces and tooth contact surfaces remain unlubricated for some period of time after the apparatus is started. This lack of lubrication has frequently resulted in damage to the apparatus and gear trains.

The second main disadvantage of locked in preloads is that this type of loading differs considerably from that frequently encountered under actual operating conditions. That is, many actual operating loads build up gradually. As a consequence, the test results obtained with the existing gear test apparatus are relatively inaccurate.

With the foregoing preliminary discussion in mind, a broad object of the invention may be stated as being the provision of gear and bearing test apparatus of the character described and a torque inducer coupling therefor which avoid the above-noted and other deficiencies.

A more specific object of the invention is to provide a gear and bearing test apparatus of the character described which starts up under a no load condition and which embodies an improved torque coupling for gradually increasing the loading on the test gearing and bearings so as to accurately simulate actual operating loads and avoid damage to the test equipment.

Another object of the invention is to provide a gear and bearing test apparatus of the character described and a torque coupling therefor which may be so designed and adjusted as to operate along any desired speed-torque curve and at any selected point on a given design curve.

Still another object of the invention is to provide a gear and bearing test apparatus wherein the actual rate of loading may be varied.

Yet another object of the invention is to provide a gear and bearing test apparatus of the character described in which a gradual torque load is developed by movement of centrifugally actuated masses in the torque coupling and wherein the movement of these masses is limited to limit the maximum induced torque load.

A further object of the invention is to provide an improved torque inducer coupling for gear and bearing test apparatus of the character described, which coupling is dynamically balanced so as to be capable of high speed operation and produces a gradually increasing torque load but no bending moments.

Other objects, advantages and features of the invention will become readily evident as the description proceeds.

The invention will now be described in detail by reference to the attached drawings, illustrating a preferred form of the present test apparatus and torque coupling, wherein:

FIG. 1 is a top plan view of the present gear test apparatus;

FIG. 2 is an enlarged section through the present torque coupling;

FIG. 3 is a section taken along line 3—3 of FIG. 2;

FIG. 4 is a section taken along line 4—4 of FIG. 2; and

FIG. 5 illustrates an adjustable stop which may be used in the torque coupling of FIGS. 2–4.

In these drawings, the illustrated four square gear and bearing test apparatus 20 will be seen to comprise a main supporting frame 22 on which are rotatably mounted a pair of torsion members or shafts 24 and 26. These torsion members are drivably connected at one end by a reaction gear train 28. This gear train is enclosed in a gear box 30 which is supported on the frame 22.

One end of the low speed shaft 32 of the reaction gear train is drivably coupled to the torsion member 24. The other end of this low speed shaft is driven by a suitable rotary drive means 34 illustratively comprising a motor 36 which is coupled by a belt drive 38 to the shaft.

Torsion member 24 comprises a pair of separate relatively turnable end sections 40 and 42, end section 40 being directly connected to the reaction gear train shaft 32, as shown. Connected between the end sections 40, 42 is a torque inducer coupling 44, soon to be described, for developing a torque, proportional to the rotary speed of the torsion member 24, which acts to relatively twist or turn the sections on their axis of rotation in such a way that the end section 42, remote from the driven end of the torsion member, is turned relative to the other end section 40 in the opposite direction to which the member is driven. The other torsion member 26 comprises a torque shaft which is afforded a predetermined torsional stiffness by reducing a portion of the shaft to a predetermined diameter, as shown.

End section 42 of torsion member 24 and the left end of torsion member 26 are provided with suitable coupling elements 46 and 48, respectively, for connecting the members to the low speed shaft 50 and high speed shaft 52 of a test gear train or gear box 54. Frame 22 will be provided with suitable mounting means, not shown, for releasably attaching the test gear box to the frame.

Referring now to FIGS. 2–4, the torque inducer coupling 44 will be seen to comprise a part 56 in the form of a cylindrical housing. Located at one side of this housing is a circular flange 58 on a sleeve hub 60. This hub carries an integral coupling element 62 for connection to the end section 40 of torsion member 24.

Flange 58 is attached to housing 56 by means of bolts 64 which extend through circumferentially elongated slots 66 in the flange and are threaded in the housing. The bolts 64 and slots 66 provide a means for drivably connecting the coupling element 62, and, therefore, end section 40, to the housing 56 as well as adjusting the relative angular positions of the housing and the coupling element and end section on the axis of rotation of the torsion member 24.

Rotatably supported in the housing 56, by ball bearing units 68, is a part 70. This part has a sleeve hub which extends to the outside of the housing and constitutes the end section 42 of torsion member 24. The inner end of part 70 is formed with a pair of spaced, circular flanges 74 and 76. Extending between and fixed against axial movement on these flanges are three pins 78 mounting sleeve bearings 80. Pins 78 are spaced 120° apart, as shown.

Rotatably mounted on each pin is a sector gear 82 which meshes with an internal ring gear segment 84 formed on the inner wall of the cylindrical housing 56. Rigid on each sector gear 82 is a radial arm 86 which forms a centrifugally actuated mass or flyweight. When coupling 44 is rotated on its axis, arms 86 swing outwardly to rotate coupling part 70 in a clockwise direction, as viewed in FIG. 3, relative to coupling part 56. Engagement of the bevelled ends of the arms 86 with the housing limits outward movement of the arms and hence relative rotation of the coupling parts.

In use of the present test apparatus, the test gear train or gear box 54 is mounted on frame 22 and its low and high speed shafts are coupled to the torsion members 24, 26, as already explained. The ratio of the reaction gear train or gear box 30, of course, is made to match that of the test gear train. When the motor 36 is energized the torsion members and gear trains are driven, the apparatus starting up under a no load condition. As the rotary speed of the torsion member 24 increases, the centrifugal masses 86 within the torque inducer coupling 44 swing outwardly.

This movement of the masses rotates end section 42 of torsion member 24, relative to end section 40, thereby inducing, in effect, a torque and a torsional twist in the torsion member 24 which is proportional to the speed of the member. The loading on the test gear train 54 and its bearings is thus gradually increased from the initial no load condition so as to accurately simulate the type of loading most frequently encountered under actual operating conditions.

The induced torque will continue to increase with an increase in the rotary speed of the torsion member 24 until further outward movement of the centrifugal masses is prevented by engagement with the coupling housing 56. To enable plotting of a speed torque curve, the angular velocity of the torsion member 24 may be measured in any convenient way, such as by a conventional magnetic speed pick-up device. The system torque is measured by a torque measuring transducer 88.

By varying the weight of the centrifugal masses and/or their effective lever arm, the speed torque curve of the coupling may be changed. The speed torque curve of the coupling may also be changed by adjusting the initial angular positions of the two end sections 40, 42 of the torsion member 24. As mentioned before, this is accomplished by releasing the coupling flange bolts 64, rotating the housing 56 slightly relative to the flange 58, and then retightening the flange bolts to lock the housing in its adjusted position, thereby positioning the flyweights in a desired preposition.

Adjustable stops 90 (FIG. 5) may be used to adjust the limit of outward movement of the centrifugal masses 86 and hence limit the maximum induced torque. In this way, the test apparatus and its torque inducer coupling may be rendered capable of operating at any selected point on the particular speed torque curve for which the coupling is designed. Thus, by proper design and adjustment of the torque inducer coupling, the present apparatus may be operated to develop any desired torque at any desired speed.

It will be evident that the rate of induced torque loading in the present apparatus is determined by the torsional stiffness of the torque loop including the torsion member 26. That is, the rate of loading may be increased by increasing the diameter of the torsion shaft 26 to increase its torsional stiffness, or decreased by decreasing this diameter.

The torque inducer coupling as well as the other parts of the present apparatus are dynamically balanced so as to be capable of high speed testing. The present apparatus will also be seen to constitute a symmetrical arrangement which develops a torque load but no bending loads on the torsion members. Also, failure due to initial inadequate lubrication, which frequently occurs in the existing gear test equipment, is avoided due to the absence of any heavy preloads in the present apparatus. Finally, it will be obvious that the present apparatus and its torque inducer coupling are compact and ideally suited for installation in test laboratories.

Numerous modifications in the design and arrangement of parts of the invention are, of course, possible within the spirit and scope of the following claims.

I claim:

1. Test apparatus comprising a frame, a rotary torque shaft on said frame, rotary torque transmission means drivably coupling one end of said shaft to the other end of said shaft to form a closed loop torque transmission system, means for driving said system in rotation, said shaft comprising a pair of coaxial, relatively rotatable shaft sections, a rotary torque inducer coupling between said shaft sections including first and second parts which are relatively rotatable about the axis of said shaft sections, means drivably connecting one shaft section to said first coupling part, means drivably connecting the other shaft section to said second coupling part, at least one centrifugal weight freely pivoted on one of said coupling parts on an axis eccentric to the center of gravity of the weight and approximately parallel to said first-mentioned axis whereby said weight may swing freely under the action of centrifugal force when said coupling is rotated, and means operatively connecting said weight and the other coupling part for causing relative rotation of said parts as said weight swings on its pivot, whereby the centrifugal force acting on said weight when said coupling is rotated by driving of said torque transmission system in rotation creates a torque in said system which is proportional to the rotary speed only of said coupling and remains constant at any given rotational speed of the coupling.

2. Test apparatus comprising a frame, a rotary torque shaft on said frame, rotary torque transmission means drivably coupling one end of said shaft to the other end of said shaft to form a closed loop torque transmission system, means for driving said system in rotation, said shaft comprising a pair of coaxial, relatively rotatable shaft sections, a rotary torque inducer coupling between said shaft sections including first and second parts which are relatively rotatable about the axis of said shaft sections, means drivably connecting one shaft section to said first coupling part, means drivably connecting the other shaft section to said second coupling part, at least one centrifugal weight freely pivoted on one of said coupling parts on an axis eccentric to the center of gravity of the weight and approximately parallel to said first-mentioned axis whereby said weight may swing freely under the action of centrifugal force when said coupling is rotated, means operatively connecting said weight and the other coupling part for causing relative rotation of said parts as said weight swings on its pivot, whereby the centrifugal force acting on said weight when said coupling is rotated by driving of said torque transmission system in rotation creates a torque in said system which is proportional to the rotary speed only of said coupling and remains constant at any given rotational speed of the coupling, and adjustable, presettable stop means on said coupling for limiting the outward swinging of said weight, whereby to limit the maximum torque which said coupling can create in said system.

3. Test apparatus comprising a frame, a rotary torque shaft on said frame, rotary torque transmission means drivably coupling one end of said shaft to the other end of said shaft to form a closed loop torque transmission system, means for driving said system in rotation, said shaft comprising a pair of coaxial, relatively rotatable shaft sections, a rotary torque inducer coupling between said shaft sections including first and second parts which are relatively rotatable about the axis of said shaft sections, means drivably connecting one shaft section to said first coupling part, means drivably connecting the other shaft section to said second coupling part, at least one centrifugal weight freely pivoted on one of said coupling parts on an axis eccentric to the center of gravity of the weight and approximately parallel to said first-mentioned axis whereby said weight may swing freely under the action of centrifugal force when said coupling is rotated, means operatively connecting said weight and the other coupling part for causing relative rotation of said parts as said weight swings on its pivot, whereby the centrifugal force acting on said weight when said coupling is rotated by driving of said torque transmission system in rotation creates a torque in said system which is proportional to the rotary speed only of said coupling and remains constant at any given rotational speed of the coupling, and an adjustable, presettable stop screw on one coupling part for limiting outward swinging movement of said weight, whereby to limit the maximum torque which said coupling can create in said system.

4. Test apparatus comprising a frame, a rotary torque shaft on said frame, rotary torque transmission means drivably coupling one end of said shaft to the other end of said shaft to form a closed loop torque transmission system, means for driving said system in rotation, said shaft comprising a pair of coaxial, relatively rotatable shaft sections, a rotary torque inducer coupling between said shaft sections including first and second parts which are relatively rotatable about the axis of said shaft sections, means drivably connecting one shaft section to said first coupling part, releasable, rotatably adjustable means drivably connecting the other shaft section to said second coupling part, whereby the latter coupling part and shaft section may be relatively rotated on said axis and then locked against relative rotation in a selected angular position to preset a torque in said system, at least one centrifugal weight freely pivoted on one of said coupling parts on an axis eccentric to the center of gravity of the weight and approximately parallel to said first-mentioned axis whereby said weight may swing freely under the action of centrifugal force when said coupling is rotated, and means operatively connecting said weight and the other coupling part for causing relative rotation of said parts as said weight swings on its pivot, whereby the centrifugal force acting on said weight when said coupling is rotated by driving of said torque transmission system in rotation creates a torque in said system which is proportional to the rotary speed only of said coupling and remains constant at any given rotational speed of the coupling.

5. Test apparatus comprising a frame, a rotary torque shaft on said frame, rotary torque transmission means drivably coupling one end of said shaft to the other end of said shaft to form a closed loop torque transmission system, means for driving said system in rotation, said shaft comprising a pair of coaxial, relatively rotatable shaft sections, a rotary torque inducer coupling between said shaft sections including first and second parts which are relatively rotatable about the axis of said shaft sections, means drivably connecting one shaft section to said first coupling part, releasable, rotatably adjustable means drivably connecting the other shaft section to said second coupling part, whereby the latter coupling part and shaft section may be relatively rotated on said axis and then locked against relative rotation in a selected angular position to preset a torque in said system, at least one centrifugal weight freely pivoted on one of said coupled parts on an axis eccentric to the center of gravity of the weight and approximately parallel to said first-mentioned axis whereby said weight may swing freely under the action of centrifugal force when said coupling is rotated, means operatively connecting said weight and the other coupling part for causing relative rotation of said parts as said weight swings on its pivot, whereby the centrifugal force acting on said weight when said coupling is rotated by driving of said torque transmission system in rotation creates a torque in said system which is proportional to the rotary speed only of said coupling and remains constant at any given rotational speed of the coupling, and adjustable, presettable stop means on said coupling for limiting the outward swinging of said weight, whereby to limit the maximum torque which said coupling can create in said system.

References Cited in the file of this patent

UNITED STATES PATENTS

| | | |
|---|---|---|
| 1,479,338 | Thomas | Jan. 1, 1924 |
| 1,785,285 | Robertson | Dec. 16, 1930 |
| 2,549,748 | Purdy | Apr. 17, 1951 |
| 2,549,751 | Spengler | Apr. 17, 1951 |
| 2,641,937 | Erhardt et al. | June 16, 1953 |
| 2,829,507 | Knudson | Apr. 8, 1958 |
| 2,935,869 | Shipley | May 10, 1960 |